United States Patent [19]
Miyakawa

[11] 3,992,714
[45] Nov. 16, 1976

[54] PHOTOGRAPHIC FILM EXPOSURE DETERMINING SYSTEM COMPENSATED FOR TEMPERATURE AND VOLTAGE FLUCTUATIONS

[75] Inventor: Seinan Miyakawa, Tokyo, Japan

[73] Assignee: Asahi Kogaku Kogyo Kabushiki Kaisha, Japan

[22] Filed: Oct. 31, 1975

[21] Appl. No.: 627,915

[30] Foreign Application Priority Data
Nov. 14, 1974   Japan.............................. 49-131343

[52] U.S. Cl.................................. 354/38; 354/43; 354/50; 354/60 R
[51] Int. Cl.².......................................... G03B 7/08
[58] Field of Search................ 354/23 R, 26, 29, 30, 354/36, 38, 43, 48, 50, 51, 60 R

[56] References Cited
UNITED STATES PATENTS

| | | | |
|---|---|---|---|
| 3,295,424 | 1/1967 | Biker ................................... | 354/48 |
| 3,641,890 | 2/1972 | Ono .................................. | 354/60 X |
| 3,808,463 | 4/1974 | Malder............................. | 354/43 X |

*Primary Examiner*—Joseph F. Peters, Jr.
*Attorney, Agent, or Firm*—Steinberg & Blake

[57] ABSTRACT

An electrical system wherein exposure time and diaphragm aperture form a pair of exposure-determining factors one of which is automatically determined by the system in connection with exposure of film in a camera. The electrical system forms an exposure meter which may either be separate from or built into a camera. A photosensitive structure is provided for responding to intensity of light at the object which is to be photographed in order to provide therefrom an electrical quantity corresponding to this light intensity. An exposure factor-determining circuit provides an electrical quantity corresponding to a combination of the sensitivity of the film which is to be exposed and the other of the above pair of exposure-determining factors. A differential amplifier is connected between the exposure factor-determining circuit and the photosensitive structure for receiving the electrical quantities therefrom and for providing an output corresponding to that one of the above pair of exposure-determining factors which is automatically determined. A single temperature-compensating device is electrically connected with the differential amplifier and with the photosensitive structure for compensating for the influence of temperature fluctuations. The exposure factor-determining circuit includes a pair of series-connected variable resistors adapted to be set according to the sensitivity of the film which is to be exposed and the other of the above pair of exposure-determining factors. This latter circuit also includes a constant current source for supplying current to the series-connected variable resistors.

10 Claims, 2 Drawing Figures

PHOTOGRAPHIC FILM EXPOSURE DETERMINING SYSTEM COMPENSATED FOR TEMPERATURE AND VOLTAGE FLUCTUATIONS

BACKGROUND OF THE INVENTION

The present invention relates to photography.

In particular, the present invention relates to exposure meters which may be independent or built into a camera.

The present invention relates especially to an electrical system which forms such an exposure meter and which is compensated so as to avoid the influence of fluctuations in ambient temperature and power source voltage, so that the electrical system of the invention can always provide correct results in a stable manner.

As is well known, certain advantages flow from utilizing semiconductor elements for systems of this type. Thus, the use of semiconductor elements enables such systems to have a compact, light-weight construction and to be operated advantageously by utilizing a battery as a power source. However, semiconductor elements have proved not to be ideal devices under all circumstances inasmuch as they are easily influenced by fluctuations in ambient temperature and the manner in which they operate varies with variations in power source voltage. As a result to these latter semiconductor properties it is extremely difficult to provide accurately operating electrical circuits which utilize semiconductors. In the case of a photographic exposure meter, whether of the built-in type or an independent unit, it is required that operations take place over a wide range of ambient temperature, which include high temperature resulting from direct sunlight during the summer to extremely low temperature encountered in mid-winter in the mountains, for example. Thus it is required that structures of this type be capable of operating properly over a temperature variation of from approximately + 50°C to − 30°C. In addition, since such exposure meters are usually operated with a battery the power of which is consumed during operation, the voltage supplied by the battery varies considerably, thus introducing a further fluctuating factor which can undesirably influence the accuracy of the operation. Accordingly, unless compensation is made for fluctuations in temperature and variation in power source, it is not possible to provide an electrical system of the above type which is capable of providing the information required for optimum exposure of film.

SUMMARY OF THE INVENTION

It is accordingly a primary object of the present invention to provide an electrical system of the above general type which is capable under all circumstances of operating in a stable, accurate manner, according to which compensation is made for fluctuations in ambient temperature and power source voltage.

A further object of the present invention is to provide a construction of this type which requires the use of only an extremely small number of reliably operating elements so that the structure of the invention can be provided at low cost and will form a compact unit of light-weight. These results are important in connection with an exposure meter independent of a camera inasmuch as such an exposure meter can be of a compact, light-weight construction as well as in connection with a exposure meter which is built into a camera since the size of the camera is not undersirably increased by having an exposure meter according to the invention built into the same.

A more particular object of the present invention is to provide a system of the above type with a single temperature-compensating device capable of providing temperature compensation not only for the photosensitive structure of the system but also for the part of the system which carries out electrical computations.

In addition, it is an object of the present invention to provide for a system of the above type an exposure factor-determining circuit which will be uninfluenced by variations in power source voltage.

Thus, it is an object of the present invention to provide a temperature compensation not only of light-receiving elements but also of the bias circuit of an amplifier of the electrical system, by way of a single element which enables the influence of temperature fluctuations to be substantially neglected.

Also, it is an object of the invention to minimize the number of elements required by the system by connecting in series a variable resistor adapted to be set according to film sensitivity and a variable resistor adapted to be set according to diaphragm aperture or exposure time, and to provide for these series-connected variable resistors a constant-current supply circuit.

According to the invention, there is an electrical system wherein diaphragm aperture and exposure time form a pair of exposure-determining factors one of which is to be automatically determined by the system in connection with exposure of film in a camera. The system includes a photosensitive means which responds to light at the object to be photographed in order to provide an electrical quantity corresponding to he intensity of this light. An exposure factor-determining circuit is provided for producing an electrical quantity corresponding to the combination of the sensitivity of the film which is exposed and the other of the above pair of exposure-determining factors. A differential amplifier is electrically connected between the above exposure factor-determining circuit and the photosensitive means for receiving the above electrical quantities the refrom and for providing from these electrical quantities an output corresponding to the one of the above pair of factors which is automatically determined by the system. A single temperature-compensating means is electrically connected both with the photosensitive means and with the differential amplifier for compensating for temperature fluctuations which otherwise would undesirably influence the operation of the system. The system includes an electrical power source and a single bias current-adjusting resistor connected between the power source and the temperature-compensating means. The exposure factor-determining circuit includes a pair of series-connected variable resistors for introducing the factor of film sensitivity and the other of the above pair of factors, and a constant current source is electrically connected with these variable resistors for supplying current thereto.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
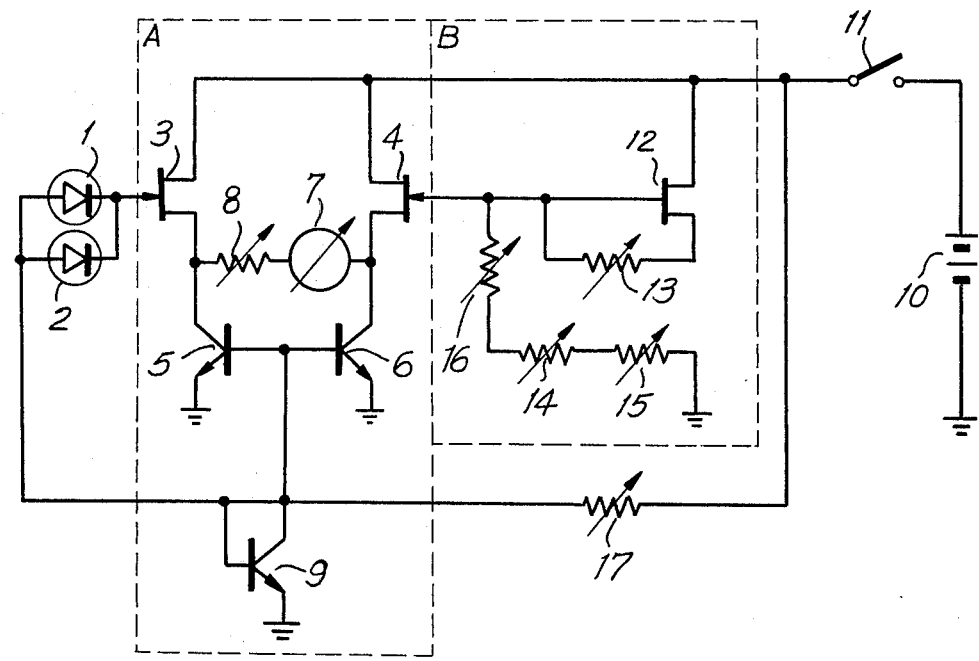
FIG. 1 is a wiring diagram of one possible embodiment of a system according to the invention.
Figure 2:
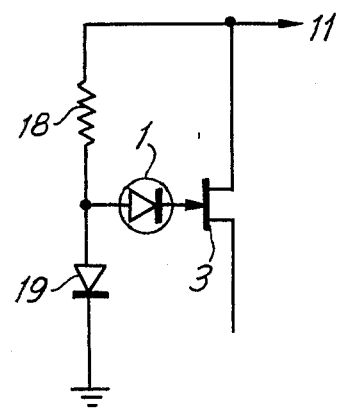
FIG. 2 is a fragmentary illustration of a known electrical circuit for illustrating the problems encountered with respect thereto.

Conventional methods for compensting for fluctuations in ambient temperature and/or variations in power source voltage include a method utilizing a constant-voltage diode and a method wherein an element such as a temperature-compensating element 19, shown in FIG. 2, is connected in series with a bias resistor 18 for compensating for the influence of temperature fluctuations on the operation of a light-receiving element such as the photodiode 1 shown in FIG. 2 connected to an FET 3. The photodiode 1 and the FET 3 correspond to the elements 1 and 3 shown in FIG. 1. The resistor 18 and the FET 3 are connected through a switch 11 to a power source as schematically shown in FIG. 2 with a corresponding circuit for the FET 3 being shown in FIG. 1. With respect to the method which utilizes a constant-voltage diode, there is a problem in that such a constant-voltage diode which will have satisfactory characteristics at low voltages is not available and proper circuit design can only be provided within a narrow operating range. With respect to the system of FIG. 2, considerable labor and time are required for selecting temperature-compensating elemets to be utilized in the circuit. In addition, in order to achieve a sufficient compensation the resistance value of the bias resistor 18 must be adjusted. Other methods are almost similar to those referred to above with respect to the complexity of the circuit arrangement, the results which can be achieved, and the undesirably high manufacturing costs, so that a fully satisfactory solution to the problem has not yet been provided.

In contrast, the circuitry of the invention which is illustrated in FIG. 1 does provide a fully satisfactory solution to the problem. Referring to FIG. 1, the system illustrated therein includes a photosensitive means, formed by photodiodes 1 and 2, for responding to light intensity at the object which is to be photograhed in order to provide an electrical quantity corresponding to this light intensity. It will be seen from FIG. 1 that the photodiodes 1 and 2 are connected in parallel. In the case of a single lens reflex camera, these light-receiving elemens 1 and 2 are situated between the pentaprism and the optical system of the eyepiece of the viewfinder, the light-receiving elements 1 and 2 being situated within the light passage of the viewfinder but outside of he viewfinder field. Although in the illustrated example a pair of separate elements 1 and 2 and shown connected in parallel with each other, a single element or three or more elements may be utilized in the system of the invention. THe electrical quantity which forms the light input information from the photodiodes 1 and 2 is transferred to a differential amplifier which includes an FET 3 which has a high input impedance and which is connected electrically to he photosensitive means 1, 2 in order to receive therefrom an input in the form of the electrical quantity corresponding to the intensity of the light at the object which is to be photographed. The differential amplifier includes another FET 4 which together with the first FET 3 forms the differential amplifier. The collectors of a pair of transistors 5 and 6 are respectively connected with the source terminals of the FETs 3 and 4, so that in this way the differential amplifier will not be influenced by variation in power source voltage and will provide an increased operational stability. The base terminals of the transistors 5 and 6 are connected to each other.

According to one of the features of the present invention, a single temperature-compensating means is connected both to the differential amplifier 3, 4 and to the photosensitive means 1, 2 in order to compensate for temperature fluctuations which otherwise might undesirably influence the operations. This temperature-compensating means includes a compensating transistor 9 which acts as a diode and which has its collector connected to the base terminals of the transistors 5 and 6 so that through these transistors the temperature-compensating transistor 9 is electrically connected with the differential amplifier 3, 4. In addition it will be seen that the temperature-compensating transistor 9 is electrically connected with the photosensitive means 1, 2.

The differential amplifier means 3, 4 provides an output corresponding to an exposure-determining factor which is to be automatically determined by the system of the invention, this latter factor being, for example, either the diaphragm aperture or the exposure time. An indicating means is provided to receive the output from the differential amplifier means 3, 4 and this indicating means includes an indicating meter 7 and a variable resistor 8 connected in series with the meter 7 for adjusting the sensitivity thereof, these series-connected components 7, 8 being connected between the source terminals of FETs 3 and 4. The transistor 9 is equivalent to a diode by directly connecting its collector and base to each other. In addition to being connected to the base terminals of the transistors 5 and 6, a terminal of each light-receiving element 1 and 2 is connected to the collector of transistor 9 which is supplied with electrical current from the electrical power source 10 with a single bias current-adjusting resistor 17 being connected between the temperature compensating means 9 and the power source 10, by way of a power source switch 11. The power source 10 also supplies the drain terminals of FETs 3 and 4 with a power source voltage.

In addition to receiving an electrical quantity from the photosensitive means 1, 2 the differential amplifier means 3, 4 receives an electrical quantity from an exposure factor-determining circuit which in accordance with a further feature of the invention includes a pair of series-connected resistors 14 and 15, the variable resistor 14 being set according to the sensitivity of the film which is exposed while the variable resistor 15 may be set according to the preselected diaphragm aperture, in the case where the meter 7 indicates exposure time. A single adjusting resistor 16 is connected in series with the series-connected resistors 14, 15 in order to adjust the characteristics thereof. The exposure factor-determining circuit means which includes the variable resistors 14–16 also includes a constant current source formed by an FET 12 and a variable resistor 13 for adjusting the constant current and electrically connected with FEt 12 in the manner illustrated. This constant current source 12, 13 is connected to the power source 10 so as to be capable of supplying constant current to the variable resistors 14 and 15.

Thus, the exposure factor-determining circuit means 12–16 will provide an electrical quantity corresponding to the combination of the sensitivity of the film which is exposed and diaphragm aperture in the case where the variable resistor is set according to the preselected diaphragm aperture, where the meter 7 indicates exposure time. Thus, the differential amplifier means 3, 4 is electrically connected between the photosensitive means 1, 2 and the exposure factor-determining circuit means 12–16 in order to receive the electrical quantities at the gates of the FETs 3 and 4 of the differential amplifier means in the manner illustrated in FIG. 1. It will furthermore be noted from FIG. 1 that through the switch 11 the electrical power source 10 is electrically connected with all of the FETs 3, 4, 12, in particular to the drain terminals thereof.

In order to be capable of automatically determining exposure time in the case where the variable resistor 15 is set according to a preselected diaphragm aperture, the film sensitivity information is introduced by properly adjusting the resistor 14 and the variable resistor 15 and the variable resistor 15 is set at a resistance value corresponding to the preselected diaphragm aperture. In the case where the system of the invention forms an exposure meter built into a camera, the diaphragm adjusting ring of the camera is directly connected to the resistor 15 in order to set the latter. After these resistors 14 and 15 have thus been adjusted, the light-receiving elements 1 and 2 are directed toward the object which is to be photographed, and the output of the differential amplifier means will be displayed at the meter 7 in the form of an exposure time which can then be manually introduced into the camera.

In the case where the electrical system of the invention is to be utilized as an independent exposure meter separate from a camera, the resistance value of resistor 15 is set not by rotating the diaphragm-adjusting ring of the camera but by rotating instead, for example, a diaphragm aperture value setting dial of the exposure meter. Otherwise the operations are identical with a built-in type of structure.

While the resistor 15 has been referred to above as utilized for introducing the factor according to the preselected diaphragm aperture, it is apparent that instead the variable resistor 15 may be utilized for introducing a preselected exposure time, for example by connecting the variable resistor 15 with a shutter-speed dial, and in this event the optimum diaphragm aperture will be indicated at the meter 7.

With an electrical system of the invention as described above high input impedance FETs are utilized in the differential amplifier and the constant-current circuit so as to eliminate the possibility of undesirable influence on the light-receiving element 1 and 2 and/or the exposure factor-detemining circuit components 14–16 from the power source 10 together with its power source switch 11 or from the meter circuit consisting of the meter 7 and the meter sensitivity adjusting resistor 8. In the circuit section enclosed within the dotted line area A in FIG. 1, the stability of the differential amplifier with respect to fluctuations in power source voltage is increased by utilizing the transistors 5 and 6 (according to the so-called long tailing method).

With the invention the diode-connected transistor 9 is provided so as to achieve temperature compensation both of the photosensitive means 1, 2 and the differential amplifier means 3, 4, simultaneously, and in addition the transistor 9 is arranged so that it can be adjusted by way of the single bias current-adjusting resistor 17. Thus, as contrasted with conventional systems, with the system of the invention it becomes possible to reduce the number of components so as to greatly facilitate the adjusting opertions and increase the operational reliability of the system. In this way it is possible to satisfy the demands of people who wish to have a light-weight compact camera or exposure meter.

Furthermore, in the circuit section enclosed within the dotted line area B shown in FIG. 1, the resistors 14 and 15 are connected in series. This arrangement enables these resistors to be adjusted by way of the single adjusting resistor 16, while in a conventional circuit where resistors corresponding to resistors 14 and 15 are connected in parallel at least a pair of such adjusting resistors would be required. As was indicated above, the exposure factor-determining circuit includes an electrical current supply from a constant-current circuit formed by the FET 12 and the constant-current adjusting resistor 13, so that a substantially stable current supply is provided for the exposure factor-determining circuit means 12–16 irrespective of variations in power source voltage and temperature fluctuations.

It is thus apparent that with the invention it is possible to compensate both for temperature fluctuation and voltage variation with a minimum number of components.

What is claimed is

1. In a system wherein exposure time and diaphragm aperture form a pair of exposure-determining factors one of which is to be automatically determined by the system in connection with exposure of film in a camera, photosensitive means for responding to light intensity at an object which is to be photographed for providing an electrical quantity corresponding to said light intensity, exposure-determining factor circuit means for providing an electrical quantity corresponding to a combination of the sensitivity of the film which is to be exposed and the other of said pair of factors, differential amplifier means electrically connected between said circuit means and said photosensitive means for receiving said electrical quantities and for providing therefrom an output corresponding to said one exposure-determining factor, and a single temperature-compensating means electrically connected with said photosensitive means and said differential amplifier means for compensating for temperature fluctuations which might undersirably influence the operation of said photosensitive means and differential amplifier means.

2. The combination of claim 1 and wherein said circuit means includes a pair of series-connected variable resistors for respectively being set according to said other exposure-determining factor and the factor of film sensitivity, and said circuit means including a constant-current means electrically connected with said series-connected variable resistors for supplying electrical current thereto.

3. The combination of claim 1 and wherein an indicating circuit means is electrically connected with said differential amplifier means for receiving said output therefrom and for indicating said one exposure-determining factor in accordance with said output.

4. The combination of claim 1 and wherein said temperature compensating means includes a single diode-connected transistor.

5. The combination of claim 4 and including an electrical power source and a single bias current-adjusting resistor connected between said power source and said diode-connected transistor.

6. The combination of claim 1 and wherein said differential amplifier means includes a pair of FETs respectively connected electrically with said photosensitive means and said circuit means for receiving said electrical quantities therefrom.

7. The combination of claim 6 and wherein a pair of transistors respectively have collectors connected to source terminals of said FETs and bases connected to each other and to said temperature-compensating means.

8. The combination of claim 2 and wherein said constant current source includes an FET and a constant current adjusting resistor electrically connected therewith.

9. The combination of claim 1 and wherein said photosensitive means includes at least one photodiode.

10. The combination of claim 7 and wherein said temperature-compensating means includes a diode-connected transistor, said photosensitive means including at least one photodiode electrically connected with the latter transistor, said circuit means including a pair of series-connected variable resistors for respectively being set according to film sensitivity and the other of said factors and a constant current source connected to said series-connected variable resistors for supplying the latter with current, said constant current source including a third FET and a variable resistor electrically connected therewith, an electrical power source connected to all of said FETs, and a single bias current-adjusting resistor electrically connected between said electrical power source and said diode-connected transistor.

* * * * *